United States Patent
Holtgrefe, Sr.

(10) Patent No.: US 7,104,005 B2
(45) Date of Patent: Sep. 12, 2006

(54) MOLE TRAP

(76) Inventor: Thomas H. Holtgrefe, Sr., 5447 Philloret Dr., Cincinnati, OH (US) 45239

( * ) Notice: Subject to any disclaimer, the term of this patent is extended or adjusted under 35 U.S.C. 154(b) by 0 days.

(21) Appl. No.: 11/031,442

(22) Filed: Jan. 7, 2005

(65) Prior Publication Data
US 2006/0150471 A1    Jul. 13, 2006

(51) Int. Cl.
*A01M 23/26* (2006.01)
(52) U.S. Cl. .................... 43/94; 43/88; 43/85
(58) Field of Classification Search ............... 43/94, 43/77, 80, 81, 85, 88, 91, 95, 97
See application file for complete search history.

(56) References Cited

U.S. PATENT DOCUMENTS

| | | | | |
|---|---|---|---|---|
| 69,878 A | | 10/1867 | Westcott | |
| 280,811 A | * | 7/1883 | Gilleland | 43/94 |
| 288,225 A | * | 11/1883 | Gilleland | 43/94 |
| 472,038 A | * | 4/1892 | Durston | 43/94 |
| 615,851 A | | 12/1898 | Hooker | |
| 1,003,891 A | * | 9/1911 | Falls | 43/78 |
| 1,160,622 A | * | 11/1915 | Ledyard | 43/94 |
| 1,296,407 A | | 3/1919 | Layton | |
| 1,382,298 A | * | 6/1921 | Lonk | 43/90 |
| 1,385,024 A | | 7/1921 | Russell | |
| 1,479,853 A | * | 1/1924 | Gambee | 43/88 |
| 1,557,043 A | | 10/1925 | Graham | |
| 1,623,925 A | * | 4/1927 | Kinzer | 43/94 |
| 1,729,976 A | * | 10/1929 | Wyman | 43/88 |
| 1,762,783 A | * | 6/1930 | Kascak | 43/94 |
| 1,764,225 A | | 6/1930 | Raymond | |
| 1,871,157 A | * | 8/1932 | Clayton | 43/94 |
| 1,924,241 A | * | 8/1933 | Hassler | 43/94 |
| 2,048,135 A | * | 7/1936 | Mygrants | 43/94 |
| 2,052,106 A | * | 8/1936 | Myklebust | 43/92 |
| 2,525,383 A | * | 10/1950 | Troutman | 43/94 |
| 4,765,087 A | * | 8/1988 | Holtgrefe, Sr. | 43/94 |
| 5,307,587 A | * | 5/1994 | Zeiger et al. | 43/88 |
| 6,101,761 A | * | 8/2000 | Sprick | 43/88 |
| 6,578,314 B1 | | 6/2003 | Schmidt | |
| 6,868,633 B1 | * | 3/2005 | Schroedl | 43/88 |
| 2003/0097781 A1 | * | 5/2003 | Schmidt | 43/88 |

OTHER PUBLICATIONS

Screenshots from www.greentreediscounts.com, relating to VICTOR brand mole traps, printed Dec. 30, 2004.

* cited by examiner

*Primary Examiner*—Kurt Rowan
(74) *Attorney, Agent, or Firm*—Frost Brown Todd LLC (57) ABSTRACT

A mole trap has a pair of spring-loaded jaws. A platform is pivotally connected to the jaws to limit the travel of the trap into the ground and to stabilize the trap on the ground when it is set. A lever assembly forces the jaws open and sets the trap. An adjustable trigger mechanism is positioned on the ground above a mole burrow. The disturbance of a mole traveling beneath the trigger causes the lever assembly to collapse, thereby permitting the jaws to close and destroy the animal.

21 Claims, 6 Drawing Sheets

MOLE TRAP

BACKGROUND OF THE INVENTION

The present invention relates to an animal trap that is particularly well-suited for destroying or otherwise trapping moles in their burrows.

Mole traps may include spring-loaded jaws and a trigger. Such traps may be set so that the jaws are positioned on either side of a mole burrow or tunnel. A trigger may be positioned on the ground above the burrow. When a mole travels between the jaws, vibration or other disturbance caused by the mole's movement may release the trigger so that the jaws close and destroy the mole. Various examples of traps may be found in U.S. Pat. Nos. 472,038; 1,296,407; 1,923,039; 2,525,383; and 4,765,087. U.S. Pat. No. 4,765,087 is incorporated by reference herein.

Conventional spring-loaded traps may be unstable when placed in the ground. Particularly after a rain shower, a trap may settle and shift so that a jaw is exposed in the mole burrow, possibly minimizing the chance that a mole will pass between the jaws. Also, the trap may shift so that a mole can pass through the burrow without being caught by the trap. Sometimes, the ground elevation at a mole burrow may be rough and uneven.

Consequently, a need exists for improvements in mole traps. It may be desirable that a mole trap include an element to stabilize and prevent the trap from shifting after it has been set. It may also be desirable that a trap include a trigger which is adjustable for a variety of purposes.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings.

Reference will now be made in detail to the present preferred embodiment of the invention, an example of which is illustrated in the accompanying drawings.

DETAILED DESCRIPTION OF EMBODIMENTS OF THE INVENTION

Figure 1:
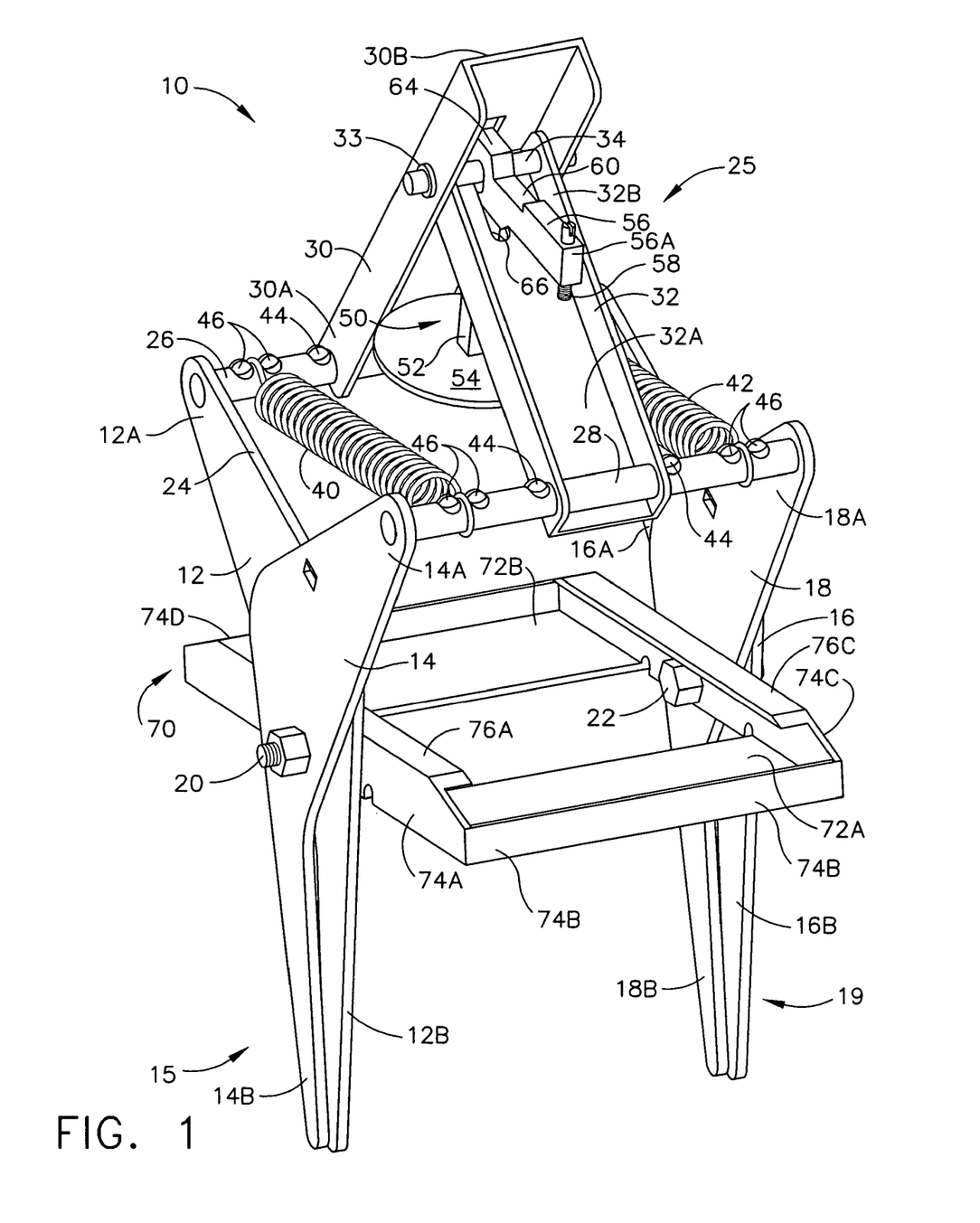
FIG. 1 is a perspective view of a mole trap in a closed position.
Figure 2:
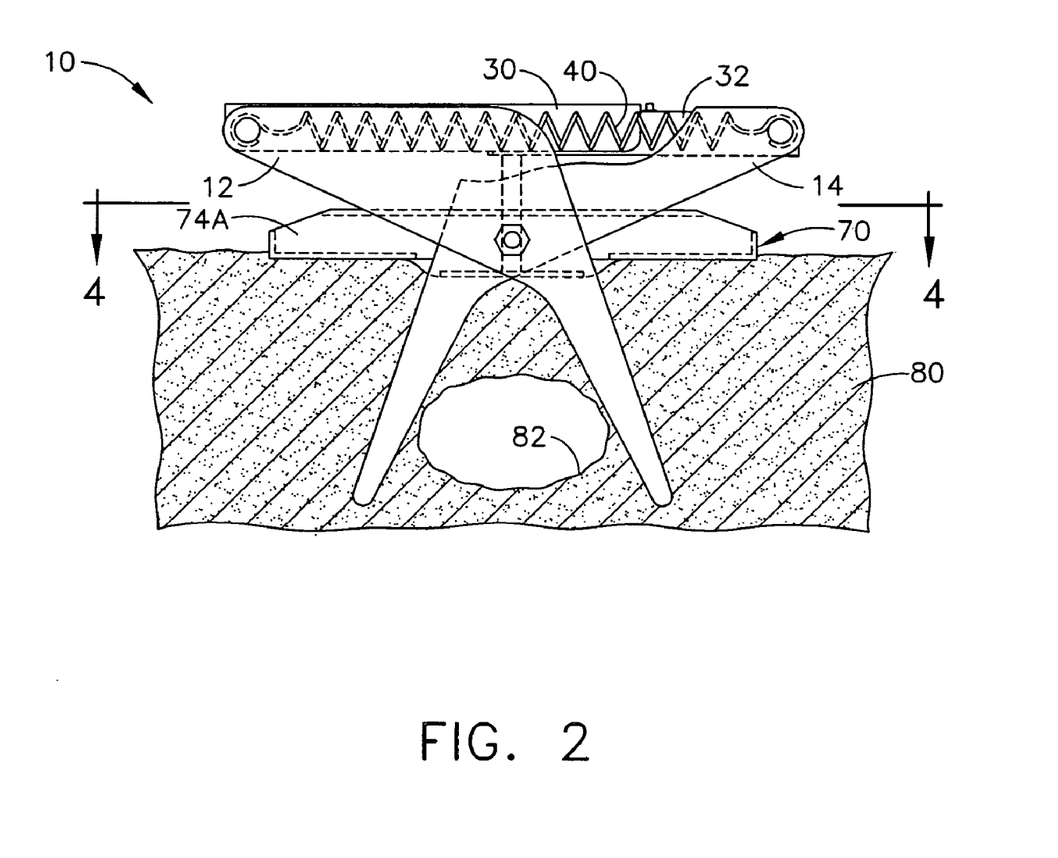
FIG. 2 is a side elevational view of the mole trap of FIG. 1 shown set in the ground adjacent a mole burrow.
Figure 3:
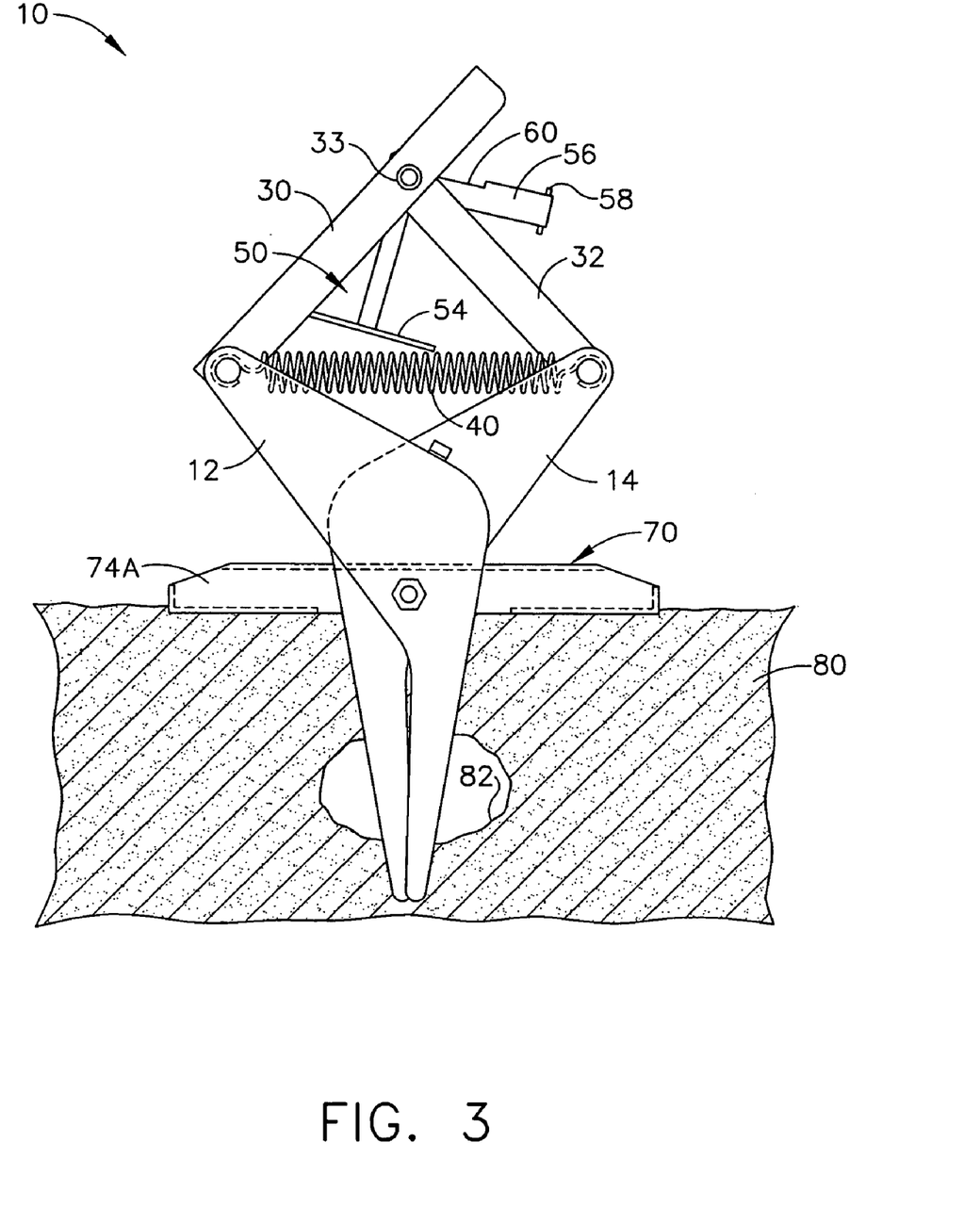
FIG. 3 is a side elevational view of the mole trap of FIG. 2 after the trap has been released.
Figure 4:
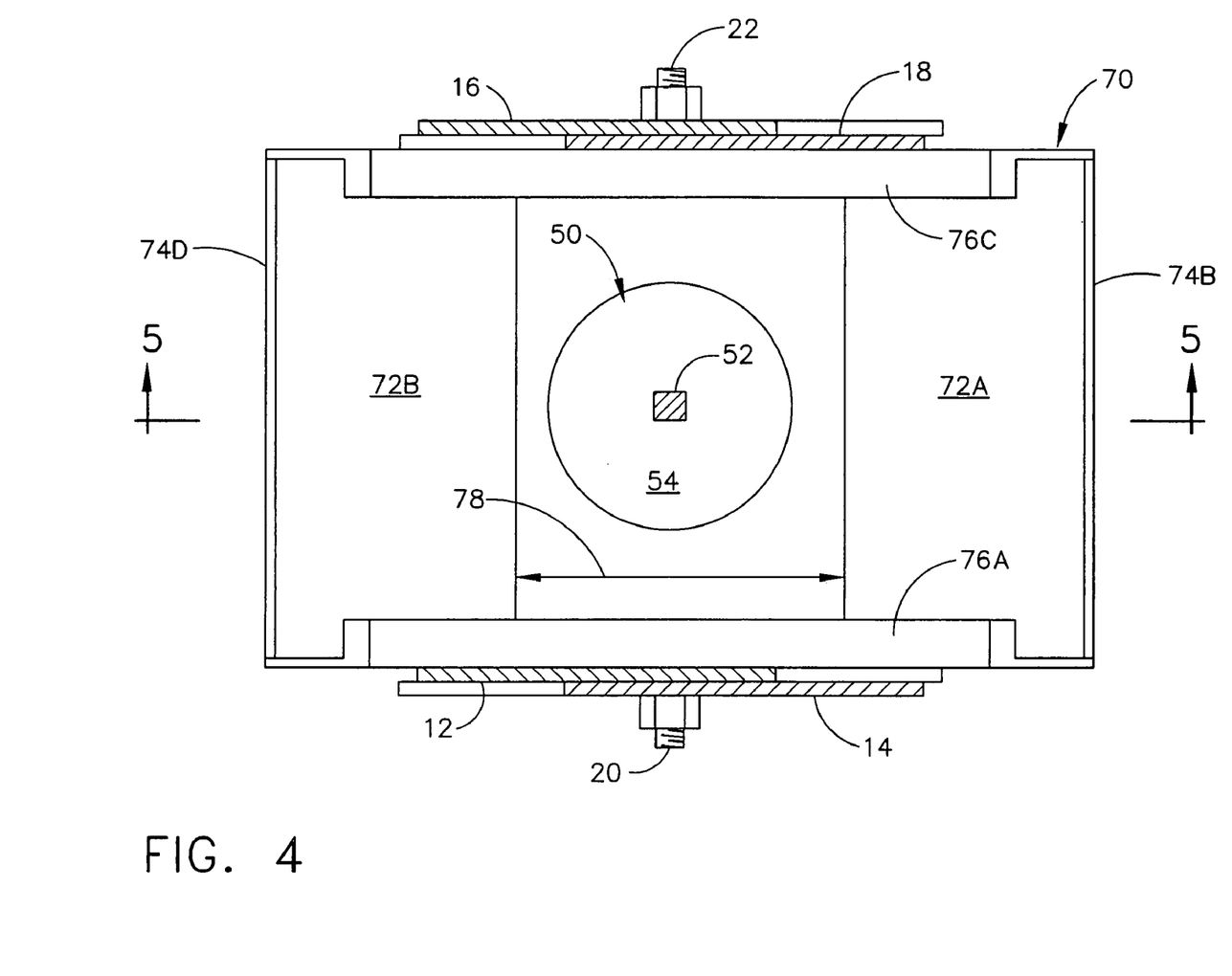
FIG. 4 is a partial cross-sectional view of the mole trap taken along line 4—4 of FIG. 2.

A merely illustrative embodiment of the mole trap of the present example, indicated generally at 10, is illustrated in FIGS. 1–3. Mole trap 10 includes first angled member 12 and second angled member 14. Angled member 12 terminates in support end 12A and opposite blade end 12B. By being "angled," angled member 12 has an offset between support end 12A and support end 12B. In the present example, near the mid-point of angled member 12, angled member 12 is angled or bent to form an angle greater than 90°. However, it will be appreciated that other angular configurations for angled member 12 may be used. It will also be appreciated that angled member 12 need not be angled or bent at all. To the extent that angled member 12 is angled or bent, such angle or bend may be located at any suitable position along angled member 12.

In a similar manner, angled member 14 includes support end 14A and blade end 14B. Angled members 12 and 14 are hinged together by fastener 20 to form first jaw 15. Any suitable fastener or securing means, including but not limited to, nuts, protrusions, caps, cotter pins, and the like, may be used.

Mole trap 10 also includes angled members 16 and 18 which are hinged together about fastener 22 to form second jaw 19. As will be apparent to those of ordinary skill in the art, angled members 16 and 18 are configured in a fashion similar to the configuration of angled members 12 and 14. As shown, each angled member 12, 14, 16, and 18, includes a radiused edge 24. Alternatively, any edge of angled members 12, 14, 16, and 18 may have any other suitable configuration.

It will be appreciated that any suitable means for facilitating pivotal movement of angled members (e.g., pivotal movement of angled member 12 with respect to angled member 14 and/or pivotal movement of angled member 16 with respect to angled member 18) may be used. By way of example only, nylon washers may be positioned at any suitable location about fasteners 20 or 22 to facilitate such pivotal movement. Other suitable means for facilitating pivotal movement, including but not limited to various structures and materials, will be apparent to those of ordinary skill in the art.

Lever assembly 25 is connected to support ends 12A, 14A, 16A, and 18A of first and second jaws 15 and 19 to load and set trap 10. Lever assembly 25 includes first connecting rod 26 which is secured to support ends 12A and 16A. Second connecting rod 28 is secured to support ends 14A and 18A. First lever 30 is pivotally connected at its first end 30A to first connecting rod 26. Second lever 32 is pivotally connected at its first end 32A to second connecting rod 28. Connecting rods 26 and 28 include protrusions 44, between which levers 30 and 32 are positioned, to prevent lateral movement of levers 30 and 32 along connecting rods 26 and 28. Any suitable alternative to protrusions 44 may be used.

While connecting rods 26 and 28 of the present example are generally cylindraceous, it will be appreciated that any other suitable shape or configuration may be used. By way of example only, connecting rods 26 and 28 may have a generally square or triangular cross-section, or a cross-section of any other shape. In addition, connecting rods 26 and 28 need not be substantially straight. For instance, connecting rods 26 and 28 may be angled or curved. Still other suitable configurations of connecting rods 26 and 28 will be apparent to those of ordinary skill in the art.

In the present example, support bar 34 is pivotally connected to first lever 30 near second end 30B of first lever 30. Of course, support bar 34 may be pivotally connected to first lever 30 at any other location along first lever 30. Second end 32B of second lever 32 is also pivotally connected to support bar 34. Retaining rings 33 may be used to retain support bar 34 with respect to the first lever 30. Alternatively, any other fastener, retainer, or securing means, including but not limited to protrusions, caps, cotter pins, and the like, may be used.

Coil springs 40 and 42 are secured to the first and second connecting rods 26 and 28 on opposite sides of the first and second levers 30 and 32. It will be appreciated that springs 40 and 42 urge first jaw 15 and second jaw 19 toward a closed position. As illustrated in FIG. 1, springs 40 and 42 are positioned between protrusions 46 along support rods 26 and 28 to prevent lateral movement of springs 40 and 42 along support rods 26 and 28. Any suitable alternative to protrusions 44 may be used. In one embodiment, springs 40 and 42 are in tension when first and second jaws 15 and 19 are closed. By way of example only, such tension may be in the range of approximately 20 to 40 pounds. Such tension may prevent a mole from escaping a closed trap 10. Alternatively, trap 10 and/or springs 40 and 42 may be configured so that they are not in tension when first and second jaws 15 and 19 are closed. It is understood that any other type of springs or resilient members may be utilized with trap 10. Also, it is possible to incorporate only one spring or resilient member, or any suitable number of springs or resilient members, with trap 10. As used herein, the phrase "resilient member" shall be read to include any structure, device, material, or the like, which is configured to urge at least two members or objects, which are in communication with the resilient member, toward or away from each other. In other words, where a resilient member is in communication with two or more objects, it will tend to urge movement of one of the objects relative another one of the objects, regardless of whether such movement actually occurs.

Figure 5:
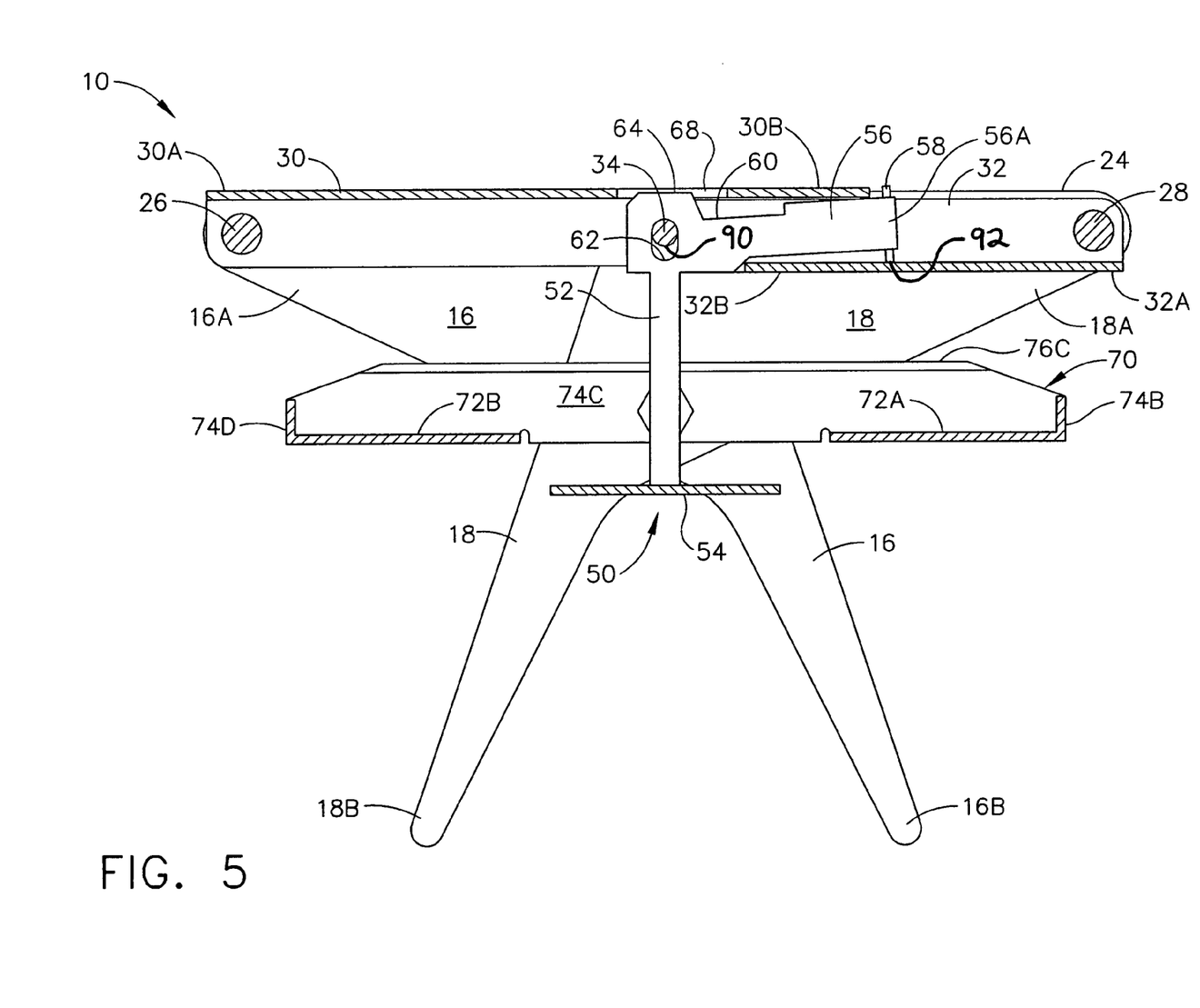
FIG. 5 is a cross-sectional side view of the mole trap taken along line 5—5 of FIG. 4 with the trigger mechanism in a partially-actuated position.
Figure 6:
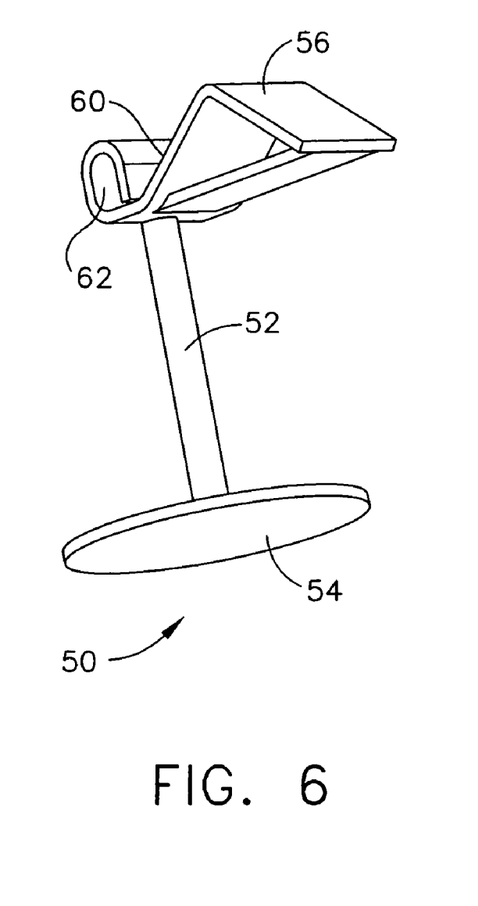
FIG. 6 is a perspective view of an alternate embodiment of the trigger mechanism.
Figure 7:
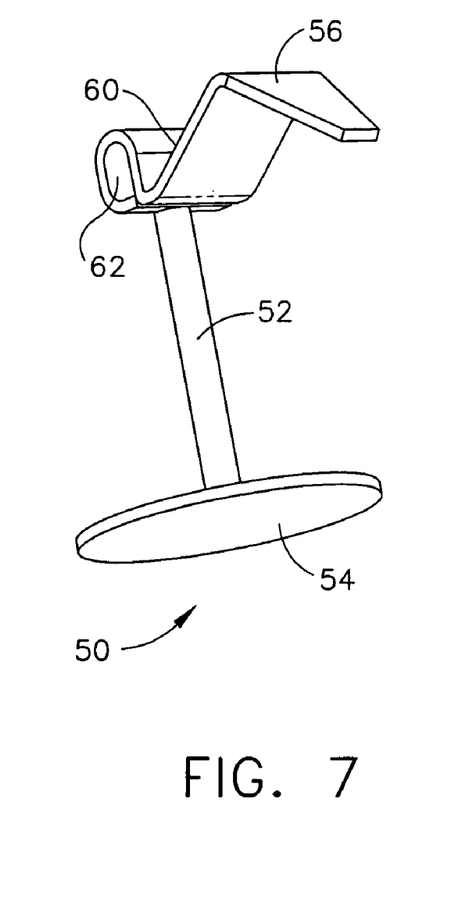
FIG. 7 is a perspective view of an alternate embodiment of the trigger mechanism.
Figure 8:
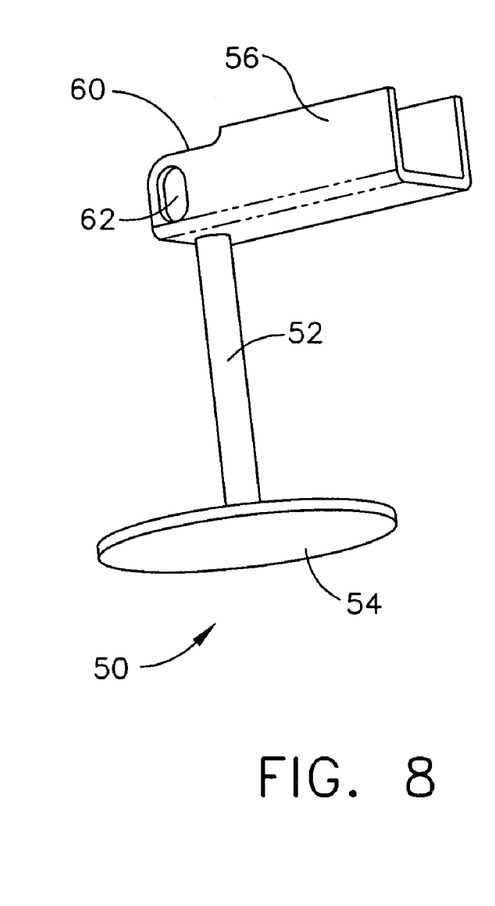
FIG. 8 is a perspective view of an alternate embodiment of the trigger mechanism.

As shown in FIGS. 1 and 5, trigger mechanism, indicated generally at 50, is pivotally connected to support bar 34. Trigger mechanism 50 includes trigger rod 52 pivotally connected at its upper end 52A to support bar 34. Trigger rod 52 may have any suitable cross sectional shape, such as generally square or circular, by way of example only. Trigger mechanism 50 further includes plate 54 connected to lower end 52B of trigger rod 52. While plate 54 is shown as being generally circular, any suitable shape may be used, such as square or rectangular, by way of example only. Plate 54 may be secured to trigger rod 52 by welding, screwing, or in any other suitable way.

In the present example, trigger arm 56 extends generally perpendicularly from upper end 52A of trigger rod 52. Alternatively, any suitable angular-relation between trigger arm 56 and trigger rod 52 may be used. It will be appreciated that trigger arm 56 may provide leverage for the exertion of a generally upward force by trigger mechanism 50 on first lever 30 and/or support bar 34.

Trigger arm 56 includes set screw 58 near arm end 56A. It will be appreciated that set screw 58 may be used to adjust the sensitivity of trigger mechanism 50. In other words, the adjustment of set screw 58 may affect the leverage provided by trigger arm 56 in the exertion of an upward force by trigger mechanism 50 on first lever 30 and/or support bar 34. The adjustment of set screw 58 may also or alternatively affect an amount of lost motion provided by trigger mechanism 50. In addition or in the alternative, the adjustment of set screw 58 may affect the positioning of first and/or second levers 30 and/or 32 when trap 10 is set, such that less movement, force, or work is required to offset levers 30 and 32 sufficiently to spring trap 10. It will be appreciated that set screw 58 may be omitted, or any suitable alternative to set screw 58 may be used. Trigger arm 56 further includes recessed portion 60. In one embodiment, recessed portion 60 provides some clearance between trigger arm 56 and first lever 30, thereby permitting some lost motion during upward movement of trigger mechanism 50 with respect to first lever 30.

While, in the present example, set screw 58 resides in trigger arm 56, it will be appreciated that set screw 58 or an alternative may be positioned at any other suitable location to achieve similar results. By way of example only, set screw 58 may be positioned within first lever 30. It will also be appreciated that, particularly when set screw 58 is positioned within first lever 30 or elsewhere, trigger arm 56 may be omitted. Other suitable configurations, including but not limited to alternative set screw 58 locations and/or set screw 58 substitutes and/or set screw 58 supplements, will be apparent to those of ordinary skill in the art.

As shown, trigger arm 56 and trigger rod 52 generally intersect at opening 62, through which support bar 34 passes. In the present example, opening 62 is elongate, providing a loose fit between trigger rod 52 and support bar 34. This loose fit may provide lost motion when trigger rod 52 is moved upwardly from a resting position before trigger mechanism 50 exerts an upward force on first lever 30 and/or support bar 34. Alternatively, opening 62 may not be elongate, and any suitable fit between trigger rod 52 and support bar 34 may be used.

Trigger mechanism 50 further includes protuberance 64 located generally above opening 62.

As illustrated in FIG. 1, elongated slot 66 is provided in second end 32B of second lever 32. Slot 66 may guide trigger rod 52 when trap 10 is set. As shown in FIG. 5, first lever 30 includes slot 68 providing clearance for protuberance 64 on trigger mechanism 50. Slot 68 may also facilitate guidance of trigger mechanism 50 when trap 10 is set, such as by restricting lateral movement of trigger mechanism 50 along support bar 34. In one embodiment, where trap 10 is mounted on a hillside, and burrow 10 runs up and down the hillside, engagement between protuberance 64 and slot 68 may inhibit undesired pendulous movement of trigger mechanism 50, thereby keeping trigger plate 54 substantially parallel to the ground 80. Where burrow 10 runs along the side of the hill, trigger arm 56 may similarly stabilize trigger mechanism 50 and inhibit undesired pendulous movement. Of course, these components may provide other advantages. In addition, other components may provide these or similar advantages.

In the present example, trap 10 is set when lever assembly 25 is in a set position. Such a set position may be provided by having levers 30 and 32 positioned such that they provide an over center configuration. In other words, when trap 10 is set, pivot provided by support bar 34 is not in-line with pivot provided by connecting rods 26 and 28. For instance, where a line ("center line") is drawn perpendicular from the axis of first support rod 26 to the axis of second support rod 28, the axis of support bar 34 may be located below this line in the present example when trap 10 is set. When trap 10 is set, lever assembly 25 will sufficiently resist forces exerted by springs 40 and 42. When the axis of support bar 34 passes above this center line, however, lever assembly 25 will essentially "collapse," such that forces exerted by springs 40 will cause trap 10 of the present example to close. As used herein, the term "collapse" shall be read to describe any configuration or action of lever assembly 25 whereby trap 10 is closed and/or closing. Accordingly, unless trap 10 is set (e.g. such that lever assembly is in a set configuration), lever assembly 25 will be collapsed. An upward force upon or movement of support bar 34 sufficient to allow trap 10 to close may be provided by trigger mechanism 50. In other words, this upward force or movement may cause lever assembly 25 to collapse.

Those of ordinary skill in the art will appreciate that trigger mechanism 50 is operable to communicate force exerted on plate 54 to at least a portion of lever assembly 25. Such communication of force may be sufficient to offset lever assembly 25, thereby permitting first jaw 15 and second jaw 19 to close. Those of ordinary skill in the art will also appreciate that the communication of force from trigger mechanism 50 to lever assembly 25 may occur at more than one contact point 90, 92. By way of example only, one such contact point 90 may be located proximate to opening 62, protuberance 64, and/or recessed portion 60. Force exerted at such contact point(s) 90 may be in a generally upward direction. As another merely illustrative example, another contact point 92 may be located proximate to end 56A. At end 56A, force may be exerted in a generally downward direction, by way of example only. In one embodiment, end 56A exerts a downward force on second lever 32 and an upward force on first lever 30. Still other suitable ways in which force may be communicated from trigger mechanism 50 to lever assembly 25 will be apparent to those of ordinary skill in the art.

While lever assembly 25 has heretofore been described as collapsing in response to an upward force or forces from trigger mechanism 50, it will be appreciated that lever assembly 25 and/or trigger mechanism 50 may be configured such that a downward force from trigger mechanism 50 causes lever assembly 25 to collapse. For instance, where a line ("center line") is drawn perpendicular from the axis of first support rod 26 to the axis of second support rod 28, the axis of support bar 34 may be located above this line in the present example when trap 10 is set. In this embodiment, lever assembly 25 may collapse when the axis of support bar 34 passes below this center line. Still other ways in which trigger mechanism 50 may cause lever assembly 25 to collapse, and other ways in which lever assembly 25 may collapse, will be apparent to those of ordinary skill in the art.

FIGS. 6 through 11 depict several alternative embodiments of trigger mechanism 50. It will be appreciated that these depictions are merely exemplary, and are therefore non-exhaustive.

As shown in FIGS. 1 through 4, platform, indicated generally at 70, is secured to mole trap 10 by fasteners 20 and 22. Platform 70 is positioned between (i.e. inside) jaws 15 and 19. Alternatively, platform 70 may be positioned outside jaws 15 and 19; or both inside and outside jaws 15 and 19. Platform 70 is a generally rectangular structure that includes horizontal planar members 72A and 72B and vertical sidewalls 74A–74D.

Planar members 72A and 72B and vertical sidewalls 74A–74D define opening 78 in platform 70. As shown, platform 70 and trigger mechanism 50 are configured such that trigger plate 54 is located proximate to opening 78 when trap 10 is set. Planar members 72A and 72B and plate 54 are sized to prevent a mole from escaping through opening 78 when trap 10 is set. By way of example only, where trigger plate 54 has a diameter of about 2", opening 78 may have a length of about 3¾" and a width of about 2¾". In another embodiment, each of planar members 72A and 72B has a length of about 4" and a width of about 2". Of course the foregoing dimensions and configurations are merely illustrative, and other suitable configurations, including but not limited to sizing and positioning of various platform 70 features, will be apparent to those of ordinary skill in the art.

Sidewalls 74A and 74C are flattened so as to form tops 76A and 76C, respectively. Top 76A and 76C are generally parallel to planar members 72A and 72B. It will be understood that tops 76A and 76C may also be provided on sidewalls 74B and 74D, if desired, or eliminated altogether. During installation, force may be applied at tops 76A and 76C, or any other suitable location, to position the trap 10. If used, tops 76A and 76C may also provide additional strength to platform 70. It will also be appreciated that tops 76A and 76C may be configured to prevent a mole from escaping through opening 78 when trap 10 is set.

Platform 70 may be pivotally connected to first and second jaws 15 and 19. As illustrated in FIGS. 1 through 4, fasteners 20 and 22 are inserted through sidewalls 74A and 74C. Fasteners 20 and 22 permit platform 70 to pivot with respect to the remainder of trap 10. Any suitable fastener or securing means, including but not limited to, nuts, protrusions, caps, cotter pins, and the like, may be used. It will also be appreciated that any suitable means for facilitating pivotal movement of platform 70 may be used, such as nylon washers by way of example only. By way of example only, nylon washers may be positioned at any suitable location about fasteners 20 or 22 to facilitate such pivotal movement. Other suitable means for facilitating pivotal movement, including but not limited to various structures and materials, will be apparent to those of ordinary skill in the art.

The installation and operation of mole trap 10 is illustrated in FIGS. 2 and 3. A force is applied on second end 30B of first lever 30 to open first and second jaws 15 and 19. As a force is applied downwardly, first and second levers 30 and 32 provide a lever action to force connecting rods 26 and 28 away from each other against the force of springs 40 and 42. As first lever 30 approaches an over center or set orientation, levers 30 and 32 lock in place so that first and second jaws 15 and 19 are opened. Jaws 15 and 19 are inserted into ground 80 on either side of mole burrow 82. As trap 10 is inserted into ground 80, platform 70 may provide resistance for trap 10 from being pushed too far into ground 80, so that the hinge points provided by fasteners 20 and 22 remain above the ground. Planar surfaces 72B and 72D provide a contact surface between trap 10 and ground 80. Platform 70 may be tilted about fasteners 20 and 22 to achieve a desired orientation. Furthermore, platform 70 may stabilize trap 10 and may prevent trap 10 from shifting when trap 10 is set in the ground.

Once trap 10 is set into position, set screw 58 may be adjusted so that plate 54 comes into contact with ground 80 above mole burrow 82. Of course, set screw 58 may be adjusted prior to trap 10 being set into position. A loose fit provided between opening 62 and support bar 34 may permit suitable angular movement so that plate 56 may be oriented to accommodate various ground terrains. In one embodiment, after trap 10 has been initially set, a user may exert a downward force on protuberance 64 to maximize the distance between the bottom of support bar 34 and the bottom of opening 62, thereby maximizing an amount of lost motion during subsequent upward movement of trigger rod 52. It will be appreciated that maximization of such lost motion may be desired when trap 10 is set on terrain that is susceptible to swelling, such that the likelihood of groundswell causing trap to collapse will be reduced.

In another embodiment of setting trap 10, trap 10 is pushed downward into ground 80 until the bottom of burrow 82 is reached. The user then adds dirt or other material underneath platform 70 and trigger plate 54. This embodiment may be desirable for users who have difficulty in pushing trap 10 into ground 80 to a depth sufficient to cause contact between platform 70 and ground 80 and/or trigger plate 54 and ground. Still other suitable methods for setting trap 10 will be apparent to those of ordinary skill in the art.

When a mole travels in mole burrow 82, vibrations or other disturbances may be transmitted through ground 80 to plate 56. As plate 54 is nudged sufficiently upwardly, first and second levers 30 and 32 are forced upwardly and out of a locked or set position, such that lever assembly 25 collapses. Springs 40 and 42 immediately close first and second jaws 15 and 19 to destroy the animal. In FIG. 3, trap 10 is shown in a closed position in mole burrow 82.

When set (see FIG. 2), trap 10 has a low profile close to ground 80.

As illustrated in FIG. 2, trigger mechanism 50 is substantially shielded by support ends 12A, 14A, 16A and 18A; levers 30 and 32; and radiused edges 24. Therefore, the upper construction of trap 10 may reduce the likelihood of accidental releases of trap 10. Other suitable ways of preventing accidental releases of trap 10 will be apparent to those of ordinary skill in the art.

A stop may be provided on the angled members 12, 14, 16 and 18 to limit the range of motion when the jaws 15 and 19 are closed. In one embodiment, a flange is provided near the mid-point of angled member 12. In a similar manner, a flange is provided on angled member 18. When jaws 15 and 19 are not open, the range of closure is limited as flanges engage angled members 14 and 16, respectively, thereby preventing injury to fingers or hands that are between support ends 12A, 14A, 16A and 18A. Alternatively, or additionally, flanges may limit the range of closure by engaging each other. It is understood that flanges may be provided on angled members 14 and 16 in orientation so as to engage angled members 12 and 18, if desired. Also, it is understood that any suitable number of flanges or flange alternatives may be used, including none at all.

Mole trap 10 may be constructed from stainless steel to resist weather and corrosion. Furthermore, it may be difficult for a mole to smell the stainless steel thereby making the animal unaware that the trap is set in place about its burrow 82. Alternatively, any other suitable material or materials may be used to construct trap 10.

In summary, numerous benefits have been described which result from employing concepts of the invention. The foregoing description of one or more embodiments of the invention has been presented for purposes of illustration and description. It is not intended to be exhaustive or to limit the invention to the precise form disclosed. Obvious modifications or variations are possible in light of the above teachings. The one or more embodiments were chosen and described in order to best illustrate principles of the invention and its practical application to thereby enable one of ordinary skill in the art to utilize the invention in various embodiments and with various modifications as are suited to the particular use contemplated. It is intended that the scope of the invention be defined by the claims appended hereto.

What is claimed is:

1. A mole trap, comprising:
   (a) a first pair of angled members hinged together to form a first jaw, wherein each angled member of the first pair terminates in a blade end and an opposite support end;
   (b) a second pair of angled members hinged together to form a second jaw, wherein each angled member of the second pair terminates in a blade end and an opposite support end;
   (c) a lever assembly in mechanical communication with the support ends of the first and second jaws, the lever assembly being configured to hold the first and second jaws in an open position when the lever assembly is in a set position, wherein the lever assembly comprises a pair of levers and a support bar joining the pair of levers;
   (d) a trigger mechanism in mechanical communication with the lever assembly, the trigger mechanism comprising:
      (i) a trigger rod having a first end and a second end,
      (ii) a trigger plate connected to the first end of the trigger rod, and
      (iii) a trigger arm having a first and second end, the first end of the trigger arm being connected to the second end of the trigger rod, wherein the trigger arm extends from the second end of the trigger rod at an angle substantially perpendicular to the trigger rod, wherein the trigger arm is generally parallel with the lever assembly when the lever assembly is in the set position, wherein the trigger arm is generally parallel with each of the first and second jaws when the lever assembly is in the set position, wherein the trigger arm extends above at least one lever of the pair of levers,
      wherein the trigger mechanism is operable to communicate a force exerted on the trigger plate to at least a portion of the lever assembly to cause the lever assembly to collapse and thereby permit the first and second jaws to close, wherein the trigger mechanism is coupled with the support bar of the lever assembly.

2. The mole trap of claim 1, further comprising one or more resilient members in mechanical communication with the first and second jaws, the one or more resilient members urging the first and second jaws to a closed position.

3. The mole trap of claim 1, wherein the trigger mechanism is configured to communicate force to the lever assembly at a plurality of contact points, the plurality of contact points including:
   (i) a first contact point located proximate to the first end of the trigger arm and second end of the trigger rod, and
   (ii) a second contact point located proximate to the second end of the trigger arm.

4. The mole trap of claim 3, wherein the force exerted at the first contact point is in a generally upward direction, wherein the force exerted at the second contact point is in a generally downward direction.

5. The mole trap of claim 1, wherein the trigger mechanism further comprises an adjustment mechanism, the adjustment mechanism being operable to adjust sensitivity of the trigger mechanism.

6. The mole trap of claim 5, wherein the adjustment mechanism comprises an adjustable screw.

7. The mole trap of claim 1, wherein the lever assembly comprises:
   (a) a first connecting rod secured to the support ends of one of the angled members of the first jaw and a complementary angled member of the second jaw;
   (b) a second connecting rod secured to the support ends of the remaining angled members of the first and second jaws;
   (c) a resilient member connected to the first and second connecting rods for biasing the jaws in a closed position;
   (d) a first lever pivotally connected to the first connecting rod; and
   (e) a second lever pivotally connected at a first end to the second connecting rod and pivotally connected at a second end to the first lever.

8. The mole trap of claim 7, wherein the second lever is pivotally connected to a support bar secured to the first lever.

9. The mole trap of claim 8, wherein the trigger mechanism is pivotally connected to the support bar.

10. The mole trap of claim 1, further comprising a platform pivotally connected to the first and second jaws.

11. The mole trap of claim 10, wherein the platform comprises a rectangular structure having a pair of vertical sidewalls and a pair of horizontal planar members, wherein the vertical sidewalls and horizontal planar members define an opening in the platform;
wherein the platform and trigger mechanism are configured such that the trigger plate is located proximate to the opening of the platform;
wherein the horizontal planar members and the trigger plate are sized to prevent a mole from escaping through the opening of the platform.

12. A mole trap, comprising:
(a) a pair of resiliently-loaded jaws having a range of movement from an open position to a closed position;
(b) lever assembly in mechanical communication with the jaws, the lever assembly being operable to set the trap in the open position, wherein the lever assembly comprises a pair of levers and a support bar joining the pair of levers;
(c) trigger mechanism in mechanical communication with the lever assembly, wherein the trigger mechanism comprises a trigger plate, a trigger arm, and a trigger rod joining the trigger arm and trigger plate, wherein the trigger arm extends above at least one lever of the pair of levers, the trigger mechanism being operable to release the trap to the closed position, wherein the trigger mechanism is coupled with the support bar of the lever assembly; and
(d) a platform hingedly connected to the jaws, wherein the platform comprises a rectangular structure having a pair of vertical sidewalls and a pair of horizontal planar members, wherein the vertical sidewalls and horizontal planar members define an opening in the platform;
wherein the platform and trigger mechanism are configured such that the trigger plate is located proximate to the opening of the platform;
wherein the horizontal planar members are configured to rest on the ground;
wherein the horizontal planar members each have a width that is greater than the height of the vertical sidewalls; and
wherein the horizontal planar members and the trigger plate are sized to prevent a mole from escaping through the opening of the platform when the trap is in a set position.

13. The mole trap of claim 12, wherein the jaws have an inside and an outside, wherein the platform is positioned within the inside of the jaws.

14. The mole trap of claim 12, wherein the opening is generally rectangular.

15. The mole trap of claim 12, wherein the trigger plate is generally circular.

16. The mole trap of claim 12, wherein the jaws are resiliently-loaded with one or more springs.

17. The mole trap of claim 12, wherein the trigger mechanism comprises:
(i) a trigger rod having a first end and a second end, wherein the trigger plate is connected to the first end of the trigger rod, and
(ii) a trigger arm having a first and second end, wherein the first end of the trigger arm is connected to the second end of the trigger rod, wherein the trigger arm extends from the second end of the trigger rod at an angle substantially perpendicular to the trigger rod.

18. The mole trap of claim 17, wherein the trigger mechanism is configured to communicate force to the lever assembly at a plurality of contact points, the plurality of contact points including:
(i) a first contact point located proximate to the first end of the trigger arm and second end of the trigger rod, and
(ii) a second contact point located proximate to the second end of the trigger arm.

19. The mole trap of claim 12, wherein the trigger plate has a diameter of approximately 2 inches, wherein the opening has a length of approximately 3¾ inches and a width of approximately 2¾ inches.

20. A mole trap, comprising:
(a) a plurality of resiliently-loaded jaws having a range of movement from an open position to a closed position;
(b) lever assembly in mechanical communication with the jaws, the lever assembly being operable to set the trap in the open position, wherein the lever assembly comprises a pair of levers and a support bar joining the pair of levers;
(c) trigger mechanism in mechanical communication with the lever assembly, wherein the trigger mechanism is coupled with the support bar of the lever assembly, wherein the trigger mechanism has adjustable sensitivity, wherein the trigger mechanism comprises:
(i) a trigger plate,
(ii) a trigger rod extending from the trigger plate, wherein the trigger rod includes an elongate opening, wherein the trigger mechanism is coupled to the lever assembly proximate to the elongate opening, wherein the trigger mechanism is operable to release the trap to the closed position, and
(iii) a trigger arm extending from the trigger rod, wherein the trigger arm extends above at least one lever of the pair of levers; and
(d) a means for adjusting the sensitivity of the trigger mechanism, wherein the means for adjusting the sensitivity of the trigger mechanism is positioned adjacent to and in contact with the lever assembly.

21. A mole trap, comprising:
(a) a first pair of angled members hinged together to form a first jaw, wherein each angled member of the first pair terminates in a blade end and an opposite support end;
(b) a second pair of angled members hinged together to form a second jaw, wherein each angled member of the second pair terminates in a blade end and an opposite support end;
(c) a lever assembly in mechanical communication with the support ends of the first and second jaws, the lever assembly being configured to hold the first and second jaws in an open position when the lever assembly is in a set position, wherein the lever assembly comprises:
(i) a first lever member,
(ii) a second lever member generally parallel with the first lever member, and
(iii) a support bar coupling the first and second lever members, wherein the support bar is generally perpendicular with the first and second lever members, wherein at least one of the first or second lever members is configured to rotate relative to the support bar; and
(d) a trigger mechanism pivotally connected to the support bar, the trigger mechanism comprising:
(i) a trigger rod having a first end and a second end, (ii) a trigger plate connected to the first end of the trigger rod, and
(iii) a trigger arm having a first and second end, the first end of the trigger arm being integrally connected with the second end of the trigger rod, wherein the trigger arm extends from the second end of the trigger rod at an angle generally perpendicular to the trigger rod, wherein the trigger arm is generally parallel with the lever assembly, wherein the trigger arm is generally parallel with each of the first and second jaws when the lever assembly is in the set position, wherein the trigger arm is generally perpendicular to the support bar when the lever assembly is in the set position, wherein the trigger arm extends above at least one of the first or second lever members;

wherein the trigger mechanism is operable to communicate a force exerted on the trigger plate to at least a portion of the lever assembly to cause the lever assembly to collapse and thereby permit the first and second jaws to close.

* * * * *